(12) United States Patent
Bergström et al.

(10) Patent No.: US 9,781,720 B2
(45) Date of Patent: Oct. 3, 2017

(54) COMPONENT CARRIER (DE)ACTIVATION IN COMMUNICATION SYSTEMS USING CARRIER AGGREGATION

(71) Applicant: Telefonaktiebolaget L M Ericsson (publ), Stockholm (SE)

(72) Inventors: Mattias Bergström, Stockholm (SE); Muhammad Kazmi, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 226 days.

(21) Appl. No.: 14/432,034

(22) PCT Filed: Sep. 13, 2013

(86) PCT No.: PCT/EP2013/068999
§ 371 (c)(1),
(2) Date: Mar. 27, 2015

(87) PCT Pub. No.: WO2014/048770
PCT Pub. Date: Apr. 3, 2014

(65) Prior Publication Data
US 2015/0296512 A1    Oct. 15, 2015

Related U.S. Application Data

(60) Provisional application No. 61/707,078, filed on Sep. 28, 2012.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/001* (2013.01); *H04L 5/0098* (2013.01);
(Continued)

(58) Field of Classification Search
CPC ............... H04W 88/02; H04W 76/046; H04W 72/0406; H04W 72/0453; H04L 5/001; H04L 5/0098; H04L 27/2601
See application file for complete search history.

(56) References Cited

U.S. PATENT DOCUMENTS 9,131,363 B2 * 9/2015 Vujcic ................ H04B 7/15507
9,203,566 B2 * 12/2015 Terry ...................... H04L 5/001
(Continued)

FOREIGN PATENT DOCUMENTS

| WO | WO 2011/149920 A2 | 12/2011 |
|---|---|---|
| WO | WO 2012/067333 A1 | 5/2012 |
| WO | WO 2012/110831 A1 | 8/2012 |

OTHER PUBLICATIONS

International Search Report and Written Opinion of the International Searching Authority, PCT Application No. PCT/EP2013/068999, dated Jan. 16, 2014.

*Primary Examiner* — Ajay Cattungal
(74) *Attorney, Agent, or Firm* — Sage Patent Group (57) ABSTRACT

A method for a user equipment, UE, and apparatus in a wireless communication system supporting carrier aggregation are provided. The UE includes a radio entity on which at least one component carrier is served by a network node. The method includes the steps of receiving a first indication from the network node for updating the at least one component carrier having an order which requires a retuning the radio entity and receiving at least a second indication for updating the at least one component carrier having an order which requires a retuning the radio entity. Further the method includes the steps of combining all orders to reduce the retuning steps of the radio entity and retuning the radio entity in accordance with the combined orders.

30 Claims, 8 Drawing Sheets

(51) Int. Cl.
*H04L 27/26* (2006.01)
*H04W 76/04* (2009.01)
*H04W 88/02* (2009.01)
(52) U.S. Cl.
CPC ..... *H04L 27/2601* (2013.01); *H04W 72/0406* (2013.01); *H04W 76/046* (2013.01); *H04W 88/02* (2013.01)

(56) References Cited

U.S. PATENT DOCUMENTS

| | | | |
|---|---|---|---|
| 2011/0243066 A1* | 10/2011 | Nayeb Nazar | H04L 1/007 370/328 |
| 2011/0243106 A1* | 10/2011 | Hsu | H04L 5/0096 370/336 |
| 2013/0051349 A1* | 2/2013 | Lv | H04L 1/0026 370/329 |
| 2014/0050139 A1* | 2/2014 | Piggin | H04W 72/005 370/312 |
| 2015/0043524 A1* | 2/2015 | Kim | H04L 5/0091 370/330 |

* cited by examiner

COMPONENT CARRIER (DE)ACTIVATION IN COMMUNICATION SYSTEMS USING CARRIER AGGREGATION

CROSS REFERENCE TO RELATED APPLICATIONS

This application is a 35 U.S.C. §371 national stage application of PCT International Application No. PCT/EP2013/068999, filed on 13 Sep. 2013, which itself claims priority to U.S. provisional Application No. 61/707,078, filed 28 Sep. 2012, the disclosure and content of both of which are incorporated by reference herein in their entirety. The above-referenced PCT International Application was published in the English language as International Publication No. WO 2014/048770 A1 on 3 Apr. 2014.

TECHNICAL FIELD

The present invention generally relates to methods and arrangements in a wireless communication system supporting carrier aggregation. In particular it relates to a method for a user equipment, UE, in a wireless communication system supporting carrier aggregation, wherein the UE comprises a radio entity on which at least one component carrier is served by a network node.

BACKGROUND

The background is described with respect to LTE (Long Term Evolution). The skilled person in the art will however realize that the principles of the invention may be applied in other radio communication systems, particularly in communication systems that rely on scheduled data transmissions.

Figure 1:
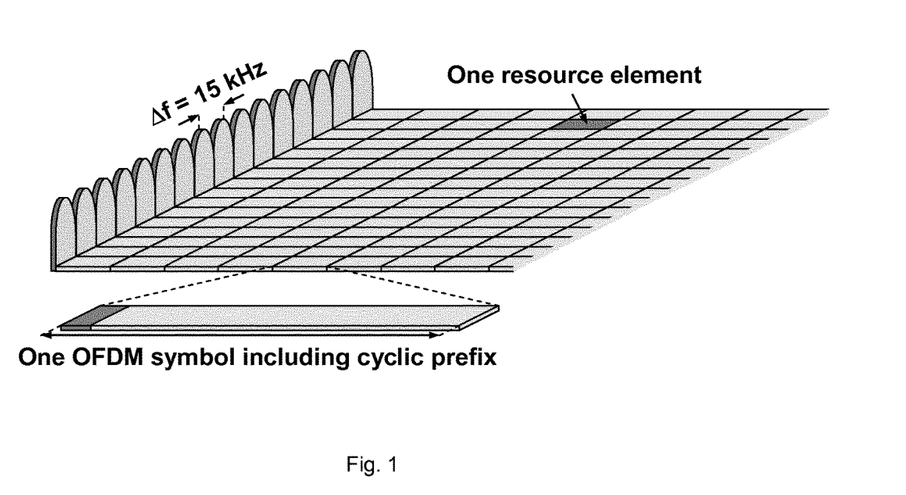
FIG. 1 illustrates an orthogonal frequency division multiple access (OFDMA) symbol structure.

The downlink transmission of the LTE, or E-UTRAN radio access, is based on Orthogonal Frequency Division Multiplex (OFDM). The basic LTE downlink physical resource can thus be seen as a time-frequency grid as illustrated in FIG. 1, where each resource element (RE) corresponds to one OFDM subcarrier during one OFDM symbol interval. The dark shadowed resource elements form a resource block. LTE uses OFDM in the downlink and DFT-spread OFDM in the uplink.

Figure 2:
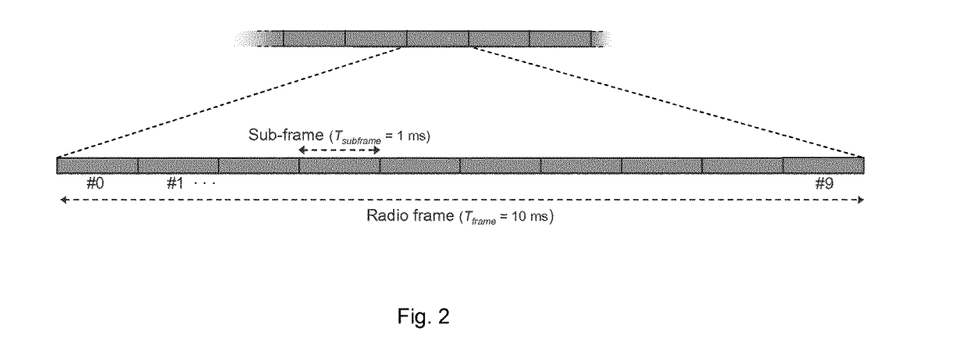
FIG. 2 illustrates a Long Term Evolution (LTE) radio frame.

In the time domain, LTE downlink transmissions are organized into radio frames of 10 ms, each radio frame consisting of ten equally-sized subframes of length $T_{subframe}=1$ ms, as depicted in FIG. 2.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a user equipment (UE) is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

Figure 3:
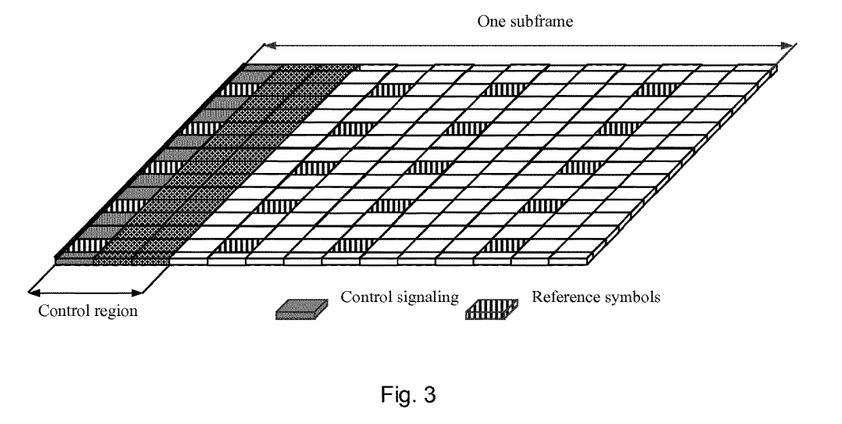
FIG. 3 illustrates the structure of a LTE downlink subframe.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols (CRS), which are known to the receiver and used for coherent demodulation of e.g. the control information. A downlink system with CFI=3 OFDM symbols as control is illustrated in FIG. 3.

Figure 4:
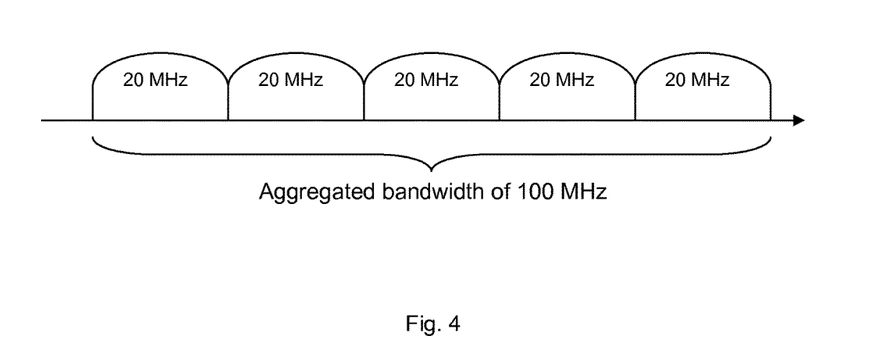
FIG. 4 illustrates aggregation of multiple component carriers.

Release 10 of the LTE specifications from the 3rd Generation Partnership Project (3GPP) supports component carrier bandwidths up to 20 MHz. However, in order to meet the International Mobile Telecommunications Advanced (IMT-Advanced) requirements for very high data rates, the concept of carrier aggregation has been introduced to support bandwidths larger than 20 MHz. The carrier aggregation concept is illustrated in FIG. 4, where five component carriers are illustrated, with respective bandwidths of f1, f2, f3, f4 and f5. In the example of FIG. 4, the total bandwidth available to a mobile terminal is the sum of the bandwidths of the cells. In the following each component carrier is named as a cell.

A UE may be configured with a subset of the cells offered by the network and the number of aggregated cells configured for one UE can change dynamically through time based on for example UE traffic demand, type of service used by the UE, system load etc. A cell which a UE is configured to use is referred to as a serving cell for that UE. A UE has one primary serving cell (called PCell) which also handles some signaling and zero or more secondary serving cells (called SCells). The term "serving cell" includes both the PCell and SCells. It is UE specific which cell is defined as the PCell.

Aside from that the concept of configuration of cells has been introduced the concept of activation has been introduced for SCells. Cells may be configured or de-configured using Radio Resource Control (RRC) signaling according to 3GPP TS 36.331 Version 11.0.0, which can be slow, and at least SCells can be activated or deactivated using a Medium Access Control (MAC) control element. Since the activation process is based on MAC control elements—which are much faster than RRC signaling—an activation/de-activation process can quickly adjust the number of activated cells to match the number that are required to fulfill data rate needed at any given time. Activation therefore provides the possibility to keep multiple cells configured for activation on an as-needed basis.

In order to preserve the orthogonality in Uplink (UL), the UL transmissions from multiple UEs need to arrive time aligned at the eNodeB. This means the transmit timing of the UEs, which are under the control of the same eNodeB, should be adjusted to ensure that their received signals arrive at the eNodeB receiver at the same time which means more specifically arriving well within the cyclic prefix (CP). This ensures that the eNodeB receiver is able to use the same resources to receive and process the signals from multiple UEs.

Figure 5A:
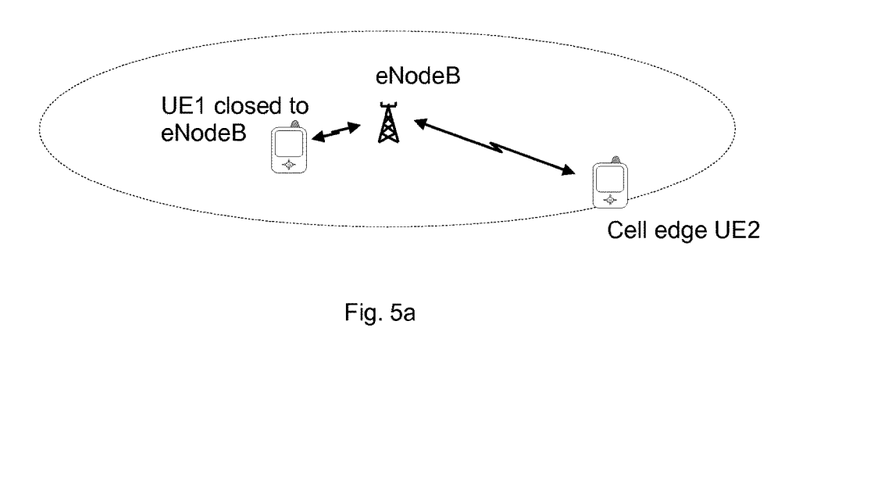
FIG. 5a illustrates communications within radio network nodes in a LTE network.
Figure 5B:
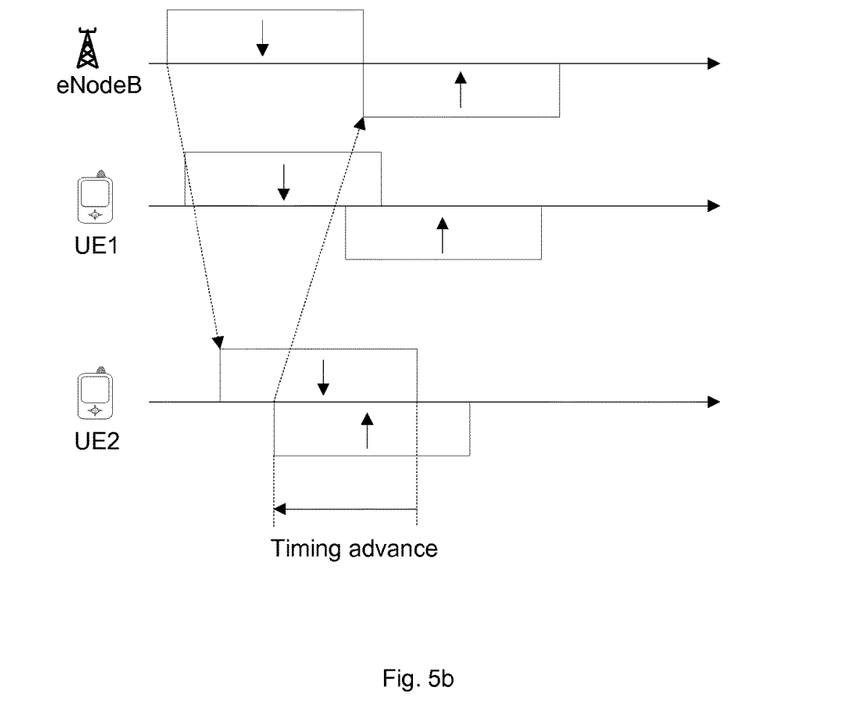
FIG. 5b illustrates an example of a timing advance of uplink transmissions.

In FIG. 5a an example is depicted in which two UEs (1 and 2) are located at different distances from the eNodeB. The UEs will need to initiate their UL transmissions at different times. UE2 which is far away from the eNodeB needs to start transmission earlier than UE1 which is located close to the eNodeB. This can for example be handled by time advance of the UL transmissions as depicted in FIG. 5b. The eNodeB sends a data frame to a UE1. UE1 receives this frame after a short delay because UE1 is located close to the eNodeB. UE1 has to send data in an UL frame a bit in advanced to ensure that the UL data is received at the eNodeB in time. UE1 starts its UL transmission before a nominal time given by the timing of the DL signal received by the UE1. UE2 is far away from the base station eNodeB. Therefore the DL data frame is received later and UE2 has to send the UL data frame much earlier than UE1 to make sure that its UL data frame is received by the eNodeB in time. The time between the sending of the UL data frame and the end of the reception of the DL data frame is called UL timing advanced. The UL timing advance is maintained by the eNodeB through timing alignment commands to the UE based on measurements on UL transmissions from that UE.

Through timing alignment commands, the UE is ordered to start its UL transmissions earlier or later. This applies to all UL transmissions except for random access preamble transmissions on Physical Random Access Control Channel (PRACH), i.e. including transmissions on the Physical Uplink Shared Channel (PUSCH), the Physical Uplink Control Channel (PUCCH), and the Sounding Reference Signals (SRS).

There is a strict relation between DL transmissions and the corresponding UL transmission. Examples of this are
    the timing between a DL-Shared Channel transmission on PDSCH to the HARQ ACK/NACK feedback transmitted in UL (either on PUCCH or PUSCH);
    the timing between an UL grant transmission on PDCCH to the UL-Shared Channel transmission on PUSCH.

By increasing the timing advance value for a UE, the UE processing time between the DL transmission and the corresponding UL transmission decreases. For this reason, an upper limit on the maximum timing advance has been defined by 3GPP in order to set a lower limit on the processing time available for a UE. For LTE, this value has been set to roughly 667 us which corresponds to a cell range of 100 km (note that the TA value compensates for the round trip delay). In LTE Rel-10 there is only a single timing advance value per UE and all UL cells are assumed to have the same transmission timing. The reference point for the timing advance is the receive timing of the primary DL cell.

In LTE Release 11 a support for multiple timing advance values was introduced. The reason for this is that it would be possible to support aggregation of cells which have different UL reception points or cells which are not time aligned, e.g. the DL transmission timing is greater than a certain threshold.

To reduce the amount of signalling or to reduce the amount of processing in the eNodeB and the UE the concept of timing advance groups, TA groups (or TAGs), was introduced. The current assumption in 3GPP is that the serving cells sharing the same TA value (for example depending on the deployment) will be configured by the NW to belong to the same TA group.

Each TA group has an associated TA value, a TA timer and a timing reference which are common for all cells belonging to the TA group. When a TA group's TA timer is running the TA value is considered valid and all cells belonging to the TA group are considered time aligned and UL transmissions are allowed to the belonging serving cells. When the TA timer expires the cells are considered non-time aligned, or out of synch, and aside from network ordered preamble transmissions all other UL transmissions are not allowed to the belonging serving cells. For each TA group the UE selects one serving cell within the TA group which serves as the timing reference cell for all cells in that TA group. The DL reception timing of the timing reference cell is the timing reference for that TA group.

To change which TA group a serving cell shall belong to it has been agreed that RRC signalling shall be used. A cell which shall move to another TA group the network will de-configure the cell and configure the cell again, with the updated TA group index.

When a UE is configured with a cell it may need to re-tune the radio frontend to cover the spectrum of the configured cell. Similarly, when a serving cell is de-configured the UE may need to re-tune its radio frontend so as to not cover the de-configured cell. As a consequence of radio frontend re-tuning the UE may need to perform an interruption, or glitch, during which the UE is not able to receive and/or transmit signals on that radio frontend from and/or to the eNodeB. When a cell is activated or deactivated the UE may also perform a glitch, similar to the case of configuration or de-configuration. As a result a UE will create unnecessary interruptions which reduce the user experience. To change the TA group to which a serving cell belongs to, the eNodeB should de-configure the serving cell and configure it again. Whenever a serving cell is configured or de-configured the UE may create a glitch during which the UE is not accessible. If the UE is ordered to activate and deactivate a serving cell within a short period of time, which for example could be done to trigger a Power Headroom Report (PHR), the UE may also create a glitch.

Whenever a glitch is performed the network and UE will not be able to communicate hence reducing UE throughput and scheduling opportunities will be lost reducing system performance which will in the end negatively affect user experience.

The problem in particular occurs in intra-band contiguous Carrier Aggregation since in this case the UE typically has common RF components for more than one Component Carrier or Cell, e.g. 40 MHz RF BW for 2×20 Component Carriers. However the invention is also applicable to inter-band Carrier Aggregation and intra-band non-contiguous Carrier Aggregation in case the UE is capable of a common set of RF components which can receive and/or transmit more than one Component Carrier, i.e. if single radio chain can receive and/or transmit two or more Component Carriers.

SUMMARY

It is an object of the present invention to improve communication between a UE and a network node of a wireless communication system. This object is achieved by the independent claims. Advantageous embodiments are described in the dependent claims.

In one embodiment of the invention, a method for a user equipment, UE, in a wireless communication system supporting carrier aggregation is provided. The UE comprises a radio entity on which at least one component carrier is served by a network node. The method comprises the steps of receiving a first indication from the network node for updating the at least one component carrier comprising an order which requires a retuning the radio entity and receiving at least a second indication for updating the at least one component carrier comprising an order which requires a retuning the radio entity. Further the method comprises the steps of combining all orders to reduce the retuning steps of the radio entity and retuning the radio entity in accordance with the combined orders.

In another embodiment of the invention, a user equipment, UE, in a wireless communication system supporting carrier aggregation is provided, wherein the UE comprises a radio entity on which at least one component carrier is served by a network node. The UE comprises a first receiving unit for receiving a first indication from the network node for updating the at least one component carrier comprising an order which requires a retuning of the radio entity, and a second receiving unit for receiving at least a second indication for updating the at least one component carrier comprising an order which requires a retuning of the radio entity. The UE further comprises a processing unit for combining all orders to reduce the retuning steps of the radio entity.

In another embodiment of the invention, a network node in a wireless communication system supporting carrier aggregation is provided, wherein the network node serves at least one component carrier on a radio entity of a user equipment, UE. The network node comprises a first processing entity for providing a first indication for updating the at least one component carrier comprising an order which requires a retuning of the radio entity, and a second processing entity for providing a second indication for updating the at least one component carrier comprising an order which requires a retuning of the radio entity. The network node further comprises a third processing entity for composing the first indication and the second indication into a composite message or a tandem message. The network node comprises further a sending entity for sending the composite or tandem message to the UE.

In another embodiment of the invention a method for a user equipment, UE, in a wireless communication system supporting carrier aggregation is provided, wherein the UE comprises a first radio entity on which at least one component carrier is served by a network node, and wherein the UE comprises a second radio entity. The method comprises the steps of receiving a first indication from the network node for updating the at least one component carrier comprising an order which requires a retuning the radio entity, and receiving at least a second indication for updating the at least one component carrier comprising an order for retuning the radio entity. Further the method comprises the steps of retuning the second radio entity in accordance with the received orders, and switching the first radio entity and the second radio entity so that the second radio entity is served by the network node.

In another embodiment of the invention a user equipment, UE, in a wireless communication system supporting carrier aggregation is provided, wherein the UE comprises a first radio entity on which at least one component carrier is served by a network node. Further the UE comprises a receiving unit for receiving a first indication from the network node for updating the at least one component carrier comprising an order which requires a retuning for the radio entity. Further the UE comprises a second radio entity, which is retuned in accordance with the received order of the indication and a switching entity for switching the first radio entity and the second radio entity after the second radio entity is retuned so that the second radio entity is served by the network node.

The present invention also concerns computer programs comprising portions of software codes in order to implement the method as described above when operated by a respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 6A:
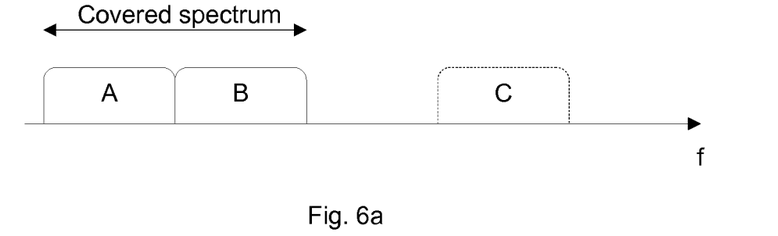
FIGS. 6a and 6b illustrate an embodiment of component carrier selection.
Figure 6B:
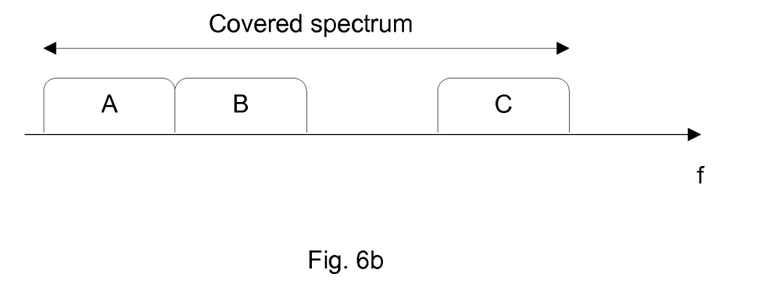
Figure 7A:
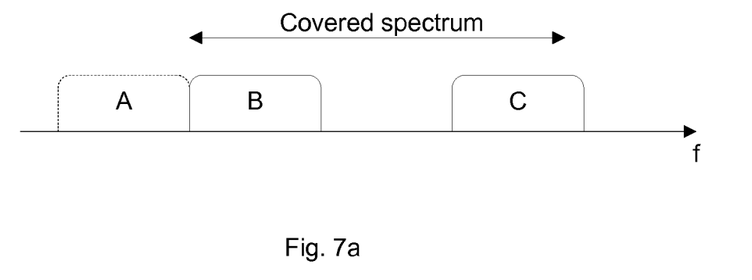
FIGS. 7a to 7c illustrate a second embodiment of component carrier selection.
Figure 7B:
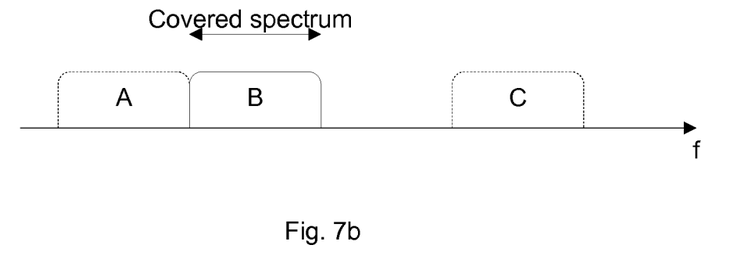
Figure 7C:
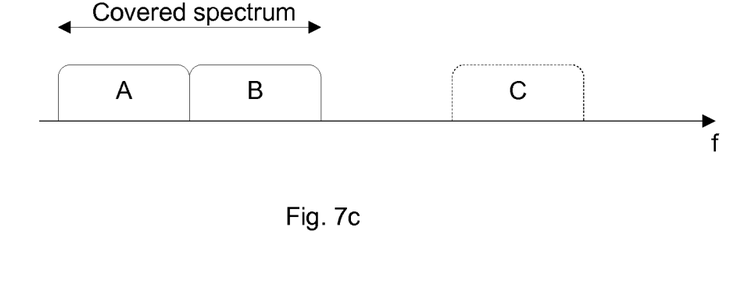
Figure 8A:
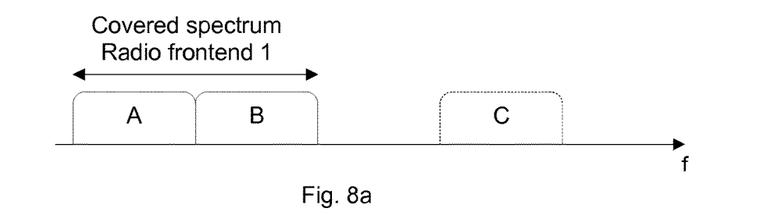
FIGS. 8a to 8c illustrate a third embodiment of component carrier selection.
Figure 8B:
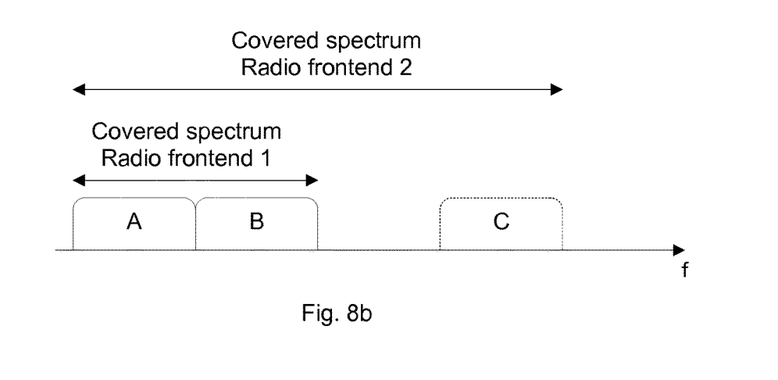
Figure 8C:
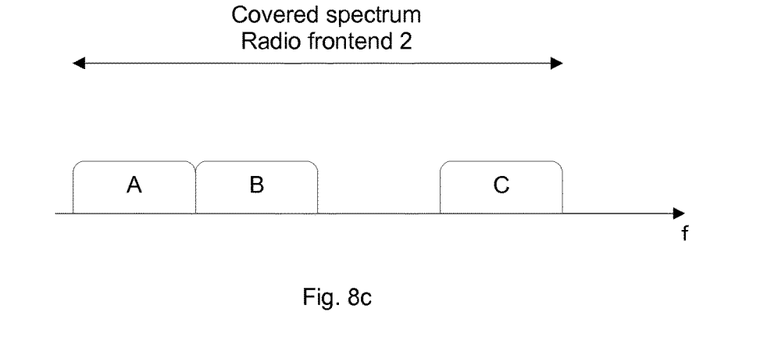

In the FIGS. 6-8 it is seen a representation of the UE RF tuning. In the examples the system offers three cells; Cell A, Cell B and Cell C. A configured (or activated) cell is identified by its solid border while a de-configured (or de-activated) cell is identified by its dashed border.

The mentioned UE can be a mobile terminal or a mobile station or any other mobile or non-mobile equipment.

In one example a UE is configured as in FIG. 6b where the UE is configured with Cell A, Cell B and Cell C and receives an order for updating of Cell C which would result in a configuration as in FIG. 6a. The term Cell is used for a component carrier. This order can be part of an indication which is encapsulated in a message. This message can be Radio Resource Control (RRC) Connection Reconfiguration message which is send from a network node of the wireless communication network which serves the UE. The order for update may be an order for configuration or de-configuration of a Cell. Further the update order may be an activation order or a de-activation order of a Cell. A further order for updating of Cell C which would, again, result in a configuration as in FIG. 6b is received afterwards. The resulting radio frontend tuning after applying these messages would therefore be similar and hence a glitch can be avoided by not allowing the radio frontend to retune.

In some embodiment the UE identifies that it has received multiple orders for actions which requires a radio frontend in the UE to be retuned, however instead of performing multiple radio frontend retunings, the UE performs one retuning hence only one glitch is created. If for example a UE has a configuration as in FIG. 7a where the UE is configured with Cell B and Cell C and receives an order for de-configuration (or de-activation) of Cell C as depicted in FIG. 7b and another order for configuration (or activation) of Cell A which would result in a configuration as in FIG. 7c. The UE would then, instead of performing two radio frontend retunings, perform only one retuning instead of two. Therefore the UE combines all received orders and reduce the amount of steps as much as possible. For example the UE may receive requests for performing two different types of measurements on the same SCell. In this case in prior art the UE may typically perform two set of retunings at different times and will cause greater loss in the system performance. For example the UE could be configured by the eNodeB to perform one or more mobility measurements and by the positioning node to measure one or more positioning measurement on deactivated SCell(s). According to the disclosed method the UE can retune the receiver at the same time for performing both types of measurements and thus will reduce the overall interruptions due to retuning. This may require the UE to measure Reference Signal Received Power and/or Quality (RSRP/RSRQ) and Reference Signal Time Difference (RSTD) around the same time. This in turn will also save UE battery power.

According to some embodiments the UE will utilize multiple radio entities which can be radio frontends to avoid a glitch by tuning a second radio entity or frontend to the resulting configuration instead of tuning a first radio frontend. In this way a glitch can be avoided.

In one embodiment the UE will identify that the UE has been ordered to perform multiple actions which each require the radio frontend to be retuned, but after performing the ordered actions the resulting radio frontend tuning is the same compared to the radio frontend tuning before the actions was performed. The UE will then refrain from performing retuning of the radio frontend and hence avoid creating a glitch.

In the example of TA group change of a serving cell the eNodeB may send a message containing an order for performing a task or a procedure or an action such as SCell update. The update of a component carrier or a SCell may comprise of any of the following:

Deconfiguration and Configuration of one or more SCells (or SCell deconfiguration/configuration)

Deactivation and activation of one or more SCells (or SCell deactivation/activation)

Cell de-configuration/configuration messages require UE to perform de-configuration of the cell or configuration of the cell. The UE would then identify that the UE should de-configure and configure the same cell and hence, after applying the two orders, the radio frontend would still cover the cell and no retuning is required. The UE can for example identify that the same cell is being de-configured and configured by identifying that one or more of the following properties are identical for the de-configured and configured cell:

Physical cell id (e.g. physCellId in the SCellToAddMod RRC element)

Cell global id (CGI) of SCell to be configured and de-configured Carrier frequency (e.g. dl-CarrierFreq in the SCellToAddMod RRC element)

SCell index (e.g. sCellIndex in the SCellToAddMod RRC element)

In the example of SCell de-activation/activation messages the network may send one PDU containing one message ordering de-activation of a serving cell and one message order activation of the serving cell. The UE would then de-activate the serving cell and (re)activate the serving cell without creating a glitch. Similarly but inversely, the PDU may contain one message ordering configuration of a serving cell and one message ordering de-configuration of the serving cell. The UE would then configure the serving cell and de-configure the serving cell without creating a glitch. The network may send a de-activation and activation message in the same PDU for example when a PHR report should be triggered. Similarly but inversely, the PDU may contain one message ordering activation of a serving cell and one message ordering de-activation of the serving cell. The UE would then activate the serving cell and de-activate the serving cell without creating a glitch. The UE may identify that it is the same SCell which shall be de-activated/activated or activated/de-activated by identifying that the same SCell Index is addressed (e.g. same SCellIndex in the Activation/Deactivation MAC control element which is used to SCell activation and deactivation). It should be appreciated also that the network may send the messages in different PDUs but which are sent at the same time.

In one embodiment the UE will recognize that no glitch shall be performed and apply a different processing delay of the messages by determining if the messages are sent in the same control message which may be a RRC message. This can for example be realized by the following table.

According to the below table 1 which is only an extract the UE will apply a processing delay given by N for different RRC procedures. N is the number of subframes from the end of reception of the E-UTRAN→UE message on the UE physical layer up to when the UE shall be ready for the reception of uplink grant for the UE→E-UTRAN response message, which may be any Setup complete message, like e.g. a Radio Resource Control Connection Reconfiguration Complete message. It can be seen that the UE will use N=20 as a baseline when configuring SCells. This value 20 is adjusted so as to compensate for a potential 5 subframe long glitch. If the UE on the other hand receives an RRC message, which may be a composite message, containing an order for de-configuration of a SCell and an order for configuration of the same SCell the UE will use N=15. This value 15 is not adjusted to compensate a glitch. The processing delay of a composite message is therefore shorter than a processing delay for a non-composite RRC message.

TABLE 1

| Procedure title: | E-UTRAN -> UE | UE -> E-UTRAN | N | Notes |
|---|---|---|---|---|
| | RRC Connection Control Procedures | | | |
| [...] | [...] | [...] | [...] | [...] |
| RRC connection re-configuration (Scell configuration/reconfiguration) | RRCConnectionReconfiguration | RRCConnectionReconfigurationComplete | 20 | |

TABLE 1-continued

| Procedure title: | E-UTRAN -> UE | UE -> E-UTRAN | N | Notes |
|---|---|---|---|---|
| | | RRC Connection Control Procedures | | |
| RRC connection reconfiguration (Scell configuration) | RRCConnectionReconfiguration | RRCConnectionReconfigurationComplete | 15 | When the UE, in the same RRC message, is ordered to deconfigure and configure the same cell. |

In one embodiment the UE will identify that the messages containing the multiple orders arrive within a certain period of time T in tandem. For example SCell update message (SCell de-configuration/configuration or SCell deactivation/activation) may be split into two sub-messages i.e. SCell de-configuration/configuration messages into separate SCell de-configuration and configuration messages within T and SCell deactivation/activation messages into separate SCell deactivation and activation messages with T.

In the example of Timing Advanced (TA) regrouping the network may at time t1 send a message containing an order for de-configuration of a cell and at time t2 send a message containing an order for configuration of the cell. If time t2 is within the certain period of time, given by value T, after time t1 the UE would refrain from retune the radio frontend.

In the example of SCell activation state change the network at time t1 may send one PDU containing a message ordering deactivation of an indicated serving cell and at time t2 send one PDU containing a message ordering activation of the same cell. The UE would then deactivate and then (re)activate the indicated serving cell without performing a glitch. It may also be possible to send both orders in one composite message according to another embodiment of the invention.

In one alternative of this embodiment the UE maintains multiple T values which are applied depending on which kind of messages are sent. For example one value T1 for the case of configuration/de-configuration and one value T2 for the case of activation/de-activation. The benefit of this is that the execution delay of different kinds of messages may be different, for example, the execution delay of cell configuration/de-configuration is currently set to 20 ms while the execution delay of a cell activation/de-activation is set to 8 ms. With this alternative of the embodiment different time delays are allowed for different types of orders which increases flexibility.

It should be appreciated that when it says that orders are "received" by the UE it may refer to the time of decoding of the messages containing the order. It may also be referred to the time when the orders are to be executed by the UE.

In prior art the UE would upon reception of multiple orders for actions which each require a radio frontend retuning handle these actions separately. If for example the UE configuration is as in FIG. 7a where the UE is configured (or activated) with Cell B and Cell C but not Cell A, and the UE received one order for de-configuration (or deactivation) of Cell C according FIG. 7b, the UE should, when executing the order perform a retuning, and hence a glitch, resulting in the configuration as in FIG. 7b. If the UE at a (short) time after receives an order for configuration (or activation) of Cell A the UE would perform another retuning, and hence another glitch, resulting in the tuning as in FIG. 7c. The UE would, with prior art methods, handle these orders separately and hence perform two (possibly partially overlapping) glitches.

In one embodiment the UE will identify that the UE has within a period of time T received messages in tandem containing multiple orders relating to multiple cells which each require the radio frontend to be retuned. Instead of performing multiple tunings of the radio frontend, e.g. one per cell, the UE will perform one radio frontend retuning which captures the multiple orders. The benefit is that the UE can avoid performing multiple glitches in some situations and hence improving user experience.

If this embodiment was applied in the situation as in the example above the following would occur: Initially the UE has a configuration as in FIG. 7a, i.e. configured (or activated) with Cell B and Cell C but not Cell A. It receives an order for de-configuration (or deactivation) of Cell C and within a period of time T after the first order receive another order for configuration (or activation) of Cell A which would result in a configuration as in FIG. 7c. The UE would instead of performing two radio frontend retunings perform only one retuning. I.e. the UE would instead of performing one retuning to capture the de-configuration (or de-activation) of Cell C and another retuning to capture the configuration (or activation) of Cell A, the UE would perform one radio frontend retuning to compensate both these changes. As the UE only performs one radio frontend retuning which compensates for both the changes only one glitch is created and user experience is improved compared to the case with two glitches.

The value of time T may be set in one of the following example ways:

The period of time (T) is predefined and could be related to the allowed delay of executing the orders. For example if the time of executing an order in the first message is x seconds the value T can be set to x so that the UE would refrain from performing the retuning if one or more following messages contain orders which renders a retune of the messages unnecessary arrives within x seconds after the first message. In this case the value of T is not signaled to the UE.

The value T is explicitly indicated by the network node prior to the first message. The UE would then apply the value T to the following messages. The network could then adjust the value T to different criterions as explained below.

The value T is explicitly indicated to the UE by the network node in the first message that a second message may be sent within the time T. This value T is either only applied to this first tandem messages or it will be applied to any future received tandem messages.

As described, the value T, to be used by the UE when tandem messages are sent, may be indicated by the network. The network node may adjust the value T so that it suits, for example based on the following conditions:

Current load conditions—In a situation when the network load is high the messages sent to the UE may experience longer delays compared to when the network load is low. If the delay is long the value T may be set to a larger value compared to then the delay is short.

Link quality between UE and network—If the link quality between the UE and the network node is poor the messages may get lost and therefore need to be retransmitted. This is expected to increase the delay of the messages and hence the value T may be set to a larger value compared to in a situation when the link quality is good.

In case the UE is capable of maintaining multiple values T the eNodeB as the network node may signal different values for these values T. As discussed above, the UE may maintain one value, for example, for configuration/de-configuration messages and another for activation/de-activation messages and the network may then adjust the value T suitable to the delay allowed to apply a configuration/de-configuration message, and the delay allowed to apply a activation/deactivation message, respectively.

It might be possible that not all UEs may be capable of:
receiving and/or applying a composite message for reducing or avoiding the number of RF retuning or glitches,
receiving and/or applying tandem message reducing or avoiding the number of RF retuning or glitches,
reducing or avoiding the number of RF retuning or glitches under multiple SCell updates,
reducing or avoiding the number of RF retuning or glitches by utilizing multiple overlapping RF components.

Therefore the UE may report its capability whether it is capable of:
receiving and applying SCell update messages in a single message (composite message) or in tandem messages or both, and/or
reducing or avoiding the number of RF retuning or glitches under multiple SCell updates, and/or
reducing or avoiding the number of RF retuning or glitches by utilizing multiple overlapping RF components.

The UE may also indicate the type of SCell update procedure for which it can receive SCell update messages in a composite or in tandem messages. The UE may also indicate whether it supports one or more of these capabilities for all or subset of SCells. The UE may also indicate whether it supports one or more of these capabilities for all supported bands or for certain bands. The UE may also simply indicate whether it supports two or more partially or fully overlapping RF frontends or radio components. The UE may also indicate whether it supports one or more of these capabilities for UL CA or for DL CA or for both. The UE may also indicate whether it can perform glitch avoidance by utilizing multiple radio frontends. For cost reasons some UE may not have multiple radio frontends. Furthermore all UEs which have multiple radio frontends may not be capable of tuning them to overlap in the way that is described by the embodiment, for example due to increase in internal interference generated when multiple radios are active in the overlap bandwidth. The UE which has ability to suppress the internal interference may indicate that it has more than two RF frontends and can also avoid the glitches or minimizes the glitches.

The UE may send the capability information (i.e. related to the supported scheme) to the network node in any of the following manner:
Proactive reporting without receiving any explicit request from the network node (e.g. serving or any target network node)
Reporting upon receiving any explicit request from the network node (e.g. serving or any target network node)

The explicit request can be sent to the UE by the network anytime or at any specific occasion. For example the request for the capability reporting can be sent to the UE during initial setup or after a cell change (e.g. handover, RRC connection re-establishment, RRC connection release with redirection, PCell change in CA, PCC change in PCC etc).

In case of proactive reporting the UE may report its capability during one or more of the following occasions:
During initial setup or call setup e.g. when establishing the RRC connection
During cell change e.g. handover, primary carrier change in multi-carrier operation, PCell change in multi-carrier operation, RRC re-establishment, RRC connection release with redirection etc.

The acquired capability information may be used by the serving network node for taking one or more radio operation tasks or actions. The tasks comprise selection of a procedure or alternative related to SCell update, adapting a parameter in a configuration message related to CA sent to the UE etc. One example of radio operation task is the decision at the network node whether to send a composite message or a tandem message to the UE for SCell update. For example depending upon the UE capability the serving node will select an alternative which is most suitable.

The network node may configure the UE whether the multiple SCell update messages will be sent to the UE in a composite message or in tandem messages. The UE can for example be informed at a suitable event or when certain condition is met or when certain scenario occurs e.g. at the time of call setup or after the cell change etc.

The network node can decide whether to send a composite message or a tandem message based on obtaining the information whether a UE supports this or not. For example the network node can obtain this information based on one or more pre-defined rules and/or explicit capability indication received from the UE i.e. UE supports the capability to avoid glitches using composite or tandem messages; the UE capability reporting is described in previous section. In case of pre-defined rules the methods in the UE of avoiding glitches upon SCell update described in previous sections can be pre-defined in a standard. This information can therefore be stored in the network node and can be used when configuring/de-configuring or activating/de-activating SCell(s) of a CA capable UE.

According to another embodiment the CA capable UE may be required to meet one or more pre-defined requirements (i.e. defined in the standard) to ensure that it supports its capability in terms of avoiding or minimizing glitches when SCell update is performed.

For example it may be pre-defined that when composite message is received for SCell update then the UE shall not cause any interruption of packets of data transmitted on any of the serving cell (PCell and SCell) regardless of the measurement cycle.

In another example it may be pre-defined that when a tandem message is received for SCell update then UE shall not cause any interruption of packets of data transmitted on any of the serving cell (PCell and SCell) regardless of the measurement cycle and/or other condition is met (e.g. T should be within a threshold).

In may also be pre-defined that UE shall not cause any interruption on packets of data transmitted on any of the serving cell (PCell and SCell) or the said interruption is less than a threshold (e.g. 0.1%) under continuous transmission when multiple SCell updates are performed.

It may also be pre-defined that the UE shall not cause any interruption on packets of data transmitted on any of the serving cell (PCell and SCell) or the said interruption is less than a threshold (e.g. 0.1%) under continuous transmission when UE has multiple RF frontend components for SCell reception and/or transmission with overlapping bandwidth.

In one embodiment it is assumed that the UE has two or more radio frontends or radio entities for transmitting and/or receiving signals e.g. two or more oscillators whose RF bandwidths fully or partially overlap. To explain the embodiment let's consider the case of two RF frontends: first and second. However the embodiment can be generalized to any number of RF front ends. The UE is initially using a first radio frontend covering the initially configured (or activated) cell(s). The UE is then ordered to perform an action which requires a change in the covered spectrum, for example a SCell update. Therefore the UE received a first indication from the network node for updating the SCells. This indication comprises an order for retuning the radio entity. Then a second indication is received for updating the SCells again. This means that the indications results in a retuning of the radio entity or frontend. According to this embodiment the UE will tune a second radio frontend to cover the resulting spectrum instead of retuning the first radio frontend. After the second radio frontend has been tuned to cover the resulting spectrum the UE may, or may not, retune or deactivate the first radio frontend.

The benefit of this embodiment is that the UE can continue to use the first radio frontend for communication until completion of retuning of the second radio frontend. When the second radio frontend has been retuned to capture the order the UE can start communicating using the second radio frontend. With this embodiment no glitch is created and hence user experience is improved. This also avoids any loss of data due to glitch.

An example of this embodiment is illustrated in FIG. 8a-c. The initial configuration is seen in FIG. 8a where the UE is configured (or activated) with Cell A and Cell B but not Cell C and the UE is using a first radio frontend to cover the spectrum of the configured (or activated) cells. In this example the UE receives an order for configuration (or activation) of Cell C. The UE will tune a second radio frontend to cover the resulting spectrum, i.e. Cell A, Cell B and Cell C, as illustrated in FIG. 8b. The Cell C will then be configured (or activated). After the second radio frontend has been correctly tuned, or after Cell C has been configured (or activated), the UE may retune or deactivate the first radio frontend as it is no longer needed the resulting configuration is seen in FIG. 8c. It should be appreciated here that retuning also includes reducing the covered bandwidth to a possibly very small bandwidth.

The advantages of the different embodiments of the invention may be summarized as follow:
- The interruption on PCell and/or SCell due to retuning of RF front end in CA is reduced.
- There is no or less loss of data due to reduced number of interruption or lower interruption probability in CA or avoidance of interruption.
- The UE processing for retuning an RF front end is reduced, thanks to lower number of RF retuning performed.

Figure 9:
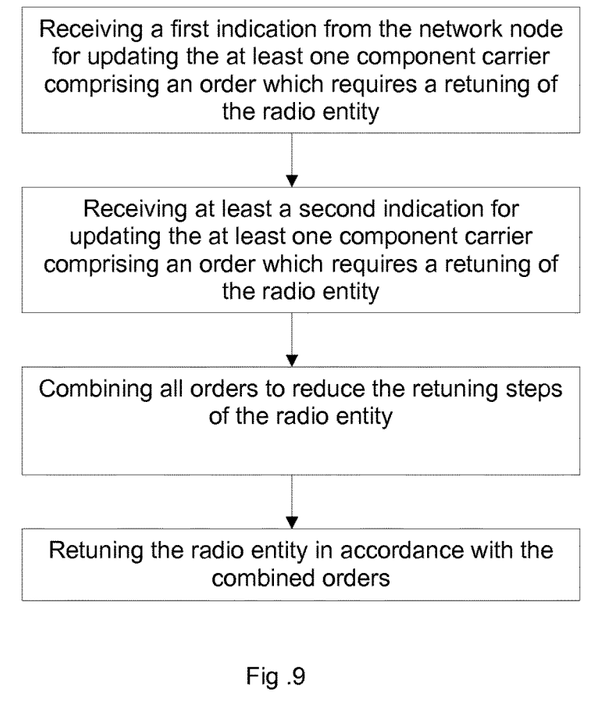
FIG. 9 illustrates a flowchart of methods according to some embodiments.

FIG. 9 shows an embodiment of the invention in a flow diagram. It is assumed that the UE comprises a radio entity on which at least one component carrier is served by a network node. This means that the network node communicates over the at least one component carrier with the radio entity of the UE.

In a first step, a first indication from the network node is received by a UE for updating the at least one component carrier comprising an order which requires a retuning of the radio entity. In a next step the UE receives at least a second indication for updating the at least one component carrier comprising an order which requires a retuning of the radio entity. In a further step all orders are combined to reduce the retuning steps of the radio entity. This combining step comprises e.g. a comparing procedure which checks the radio retuning steps and the identity of the component carriers or Cells (SCells) to reduce the retuning. It is also possible that several retuning steps can be combined into one retuning step. The last step according to this embodiment comprises the retuning of the radio entity which may be a frontend in accordance with the combined orders which are the result of the previous step.

Figure 10:
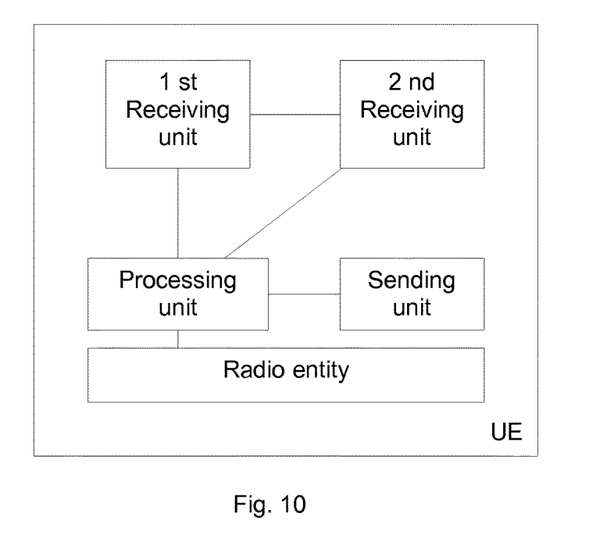
FIG. 10 illustrates a user equipment according to some embodiments.

FIG. 10 shows an embodiment of a UE comprising a Radio entity which may be a radio frontend on which at least one component carrier is served by a network node. The UE comprises further a first Receiving unit for receiving a first indication from the network node for updating the at least one component carrier comprising an order which requires a retuning of the radio entity. The UE further comprises a second Receiving unit for receiving at least a second indication for updating the at least one component carrier comprising an order which requires a retuning of the radio entity. The UE further comprises a processing unit for combining all orders to reduce the retuning steps of the radio entity. It is possible that both receiving units are combined in one receiving unit.

In a further embodiment, the UE comprises additionally a Sending unit for sending, after a processing delay, a setup complete message to the network node.

Figure 11:
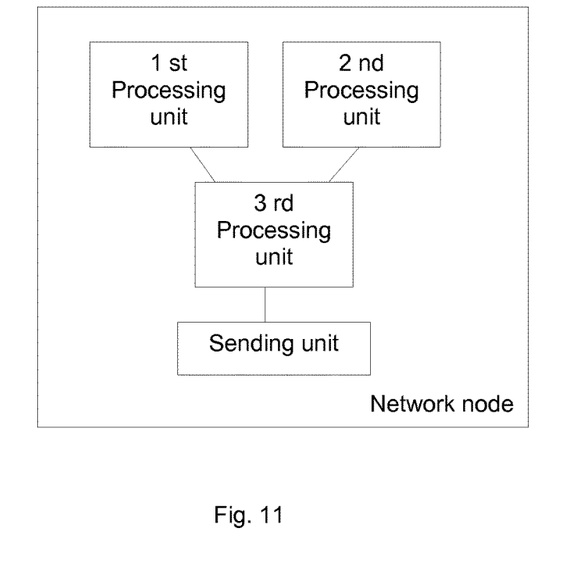
FIG. 11 illustrates a network node according to some embodiments.

FIG. 11 depicts a network node according to some embodiments of the invention. The network node serves a radio entity of a user equipment, UE, over at least one component carrier. This means that the network node is communicating over the at least one component carrier with the radio entity of the UE to exchange data. The network node comprises a first processing unit for providing a first indication for updating the at least one component carrier comprising an order which requires a retuning of the radio entity, and a second processing unit for providing a second indication for updating the at least one component carrier comprising an order which requires a retuning of the radio entity. Further the network node comprises a third processing unit for composing the first indication and the second indication into a composite message or a tandem message and a sending unit for sending the composite or tandem message to the UE. The processing units can be combined in one or more processors.

Figure 12:
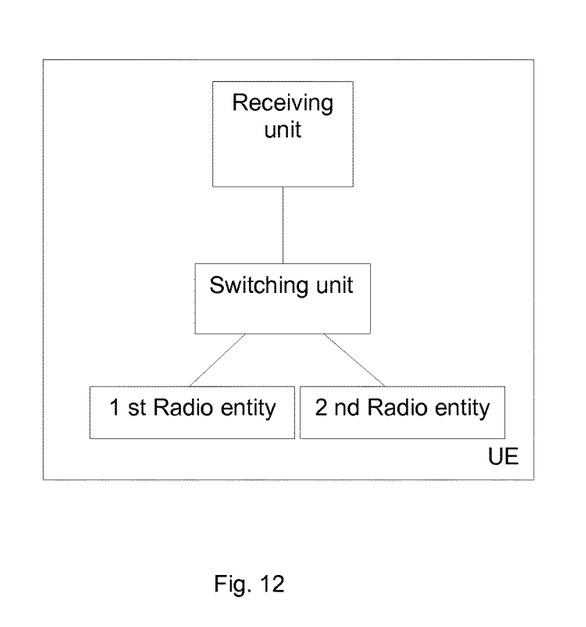
FIG. 12 illustrates a user equipment according to some embodiments.

FIG. 12 depicts a UE according to another embodiment of the invention comprising a first radio entity on which at least one component carrier is served by a network node, and a receiving unit for receiving an indication from the network node for updating the at least one component carrier comprising an order which requires a retuning of the radio entity. The UE further comprises a second radio entity, which is retuned in accordance with the received order of the first indication. Further the UE comprises a switching unit for switching the first radio entity and the second radio entity after the second radio entity is retuned so that the second radio entity is served by the network node which means that the second radio entity is communicating with the network node. The switching unit is adapted to exchange the radio entities so that the second radio entity becomes active and the first radio entity becomes inactive. It may also be possible that the active second radio entity becomes inactive in a next update procedure. Then the first radio entity becomes active again after it has been retuned.

The invention claimed is:

1. A method for a user equipment, UE, in a wireless communication system supporting carrier aggregation, wherein the UE comprises a radio entity on which at least one component carrier is served by a network node, comprising:
   receiving a first indication from the network node for updating the at least one component carrier comprising an order which requires a retuning of the radio entity,
   receiving at least a second indication for updating the at least one component carrier comprising an order which requires a retuning of the radio entity,
   combining all orders to reduce the retuning steps of the radio entity, and
   retuning the radio entity in accordance with the combined orders.

2. The method according to claim 1, further comprising: sending, after a processing delay, a setup complete message to the network node.

3. The method according to claim 1, wherein the first indication and the at least second indication are encapsulated in a composite control message.

4. The method according to claim 2, wherein the processing delay is shorter than another processing delay for sending a setup complete message for a non-composite control message for updating the at least one secondary component carrier.

5. The method according to claim 2, wherein the processing delay is 15 ms and the other processing delay is 20 ms.

6. The method according to claim 1, wherein the first indication is encapsulated in a first control message and the at least second indication is encapsulated in at least a second control message.

7. The method according to claim 6, wherein the UE only combines the orders of the indications which have been received in a specific period of time.

8. The method according to claim 7, wherein the specific period of time is indicated by the network node to the UE before the first control message is sent to the UE.

9. The method according to claim 7, wherein the specific period of time is indicated by the network node to the UE in the first control message received by the UE.

10. The method according to claim 7, wherein the specific period of time is defined by the network node based on a current network load condition of the wireless communication network.

11. The method according to claim 7, wherein the specific period of time is defined by the network node based on the link quality between the network node and the UE.

12. The method according to claim 1, wherein the received first indication is an indication for de-configuration of a component carrier and the received second indication is an indication for configuration of the same component carrier and wherein the UE does not retune the radio entity.

13. The method according to claim 1, wherein the control message is a Radio Resource Control, RRC, Connection Reconfiguration message.

14. The method according to claim 1, wherein the setup complete message is a Radio Resource Control, RRC, Connection Reconfiguration Complete message.

15. The method according to claim 1, wherein the control message is sent from the network node to the UE to change the secondary component carrier from one timing advanced group to another timing advanced group.

16. The method according to claim 1, wherein the radio entity is a radio frontend.

17. The method according to claim 1, further comprising: sending from the UE to the network node a capable indicator which indicates to the network node that the UE is capable of processing a composite control message for combining all orders of the composite control message to reduce the retuning steps of the radio component.

18. The method according to claim 1, further comprising: sending from the UE to the network node an capable indicator which indicates to the network node that the UE is capable of processing all control messages, received in a specific period of time for combining all orders of the control messages to reduce the retuning steps of the radio component.

19. A user equipment, UE, in a wireless communication system supporting carrier aggregation, wherein the UE comprises a radio entity on which at least one component carrier is served by a network node, comprising:
   a first receiving unit for receiving a first indication from the network node for updating the at least one component carrier comprising an order which requires a retuning of the radio entity,
   a second receiving unit for receiving at least a second indication for updating the at least one component carrier comprising an order which requires a retuning of the radio entity, and
   a processing unit for combining all orders to reduce the retuning steps of the radio entity.

20. The user equipment according to claim 19, wherein the UE further comprises a sending unit for sending, after a processing delay, a setup complete message to the network node.

21. The user equipment according to claim 19, wherein the first indication and the at least second indication are encapsulated in a composite control message.

22. A network node in a wireless communication system supporting carrier aggregation, wherein the network node serves a radio entity of a user equipment, UE, over at least one component carrier, comprising:
   a first processing unit for providing a first indication for updating the at least one component carrier comprising an order which requires a retuning of the radio entity,
   a second processing unit for providing a second indication for updating the at least one component carrier comprising an order which requires a retuning of the radio entity,
   a third processing unit for composing the first indication and the second indication into a composite message or a tandem message, and
   a sending unit for sending the composite or tandem message to the UE.

23. The network node according to claim 22, wherein the third processing unit composes the first and the second indication into a composite message when the updates of the second component carrier are due to a change of the timing advanced group of the second component carrier.

24. The network node according to claim 22, wherein the network node comprises:
   a fourth processing unit for determining a period of time during which the UE should combine all orders of the received indications, and
   another sending unit for sending the period of time value to the UE.

25. The network node according to claim 24, wherein the determination of the period of time is based on a current load condition of the wireless communication network.

26. The network node according to claim 24, wherein the determination of the period of time is based on a link quality between the network node and the UE.

27. The network node according to claim 22, wherein the first indication and the second indication are encapsulated in a composite control message.

28. A method for a user equipment, UE, in a wireless communication system supporting carrier aggregation, wherein the UE comprises a first radio entity on which at least one component carrier is served by a network node, and wherein the UE comprises a second radio entity, comprising:
  receiving a first indication from the network node for updating the at least one component carrier comprising an order which requires a retuning of the radio entity,
  receiving at least a second indication for updating the at least one component carrier comprising an order which requires a retuning of the radio entity,
  retuning the second radio entity in accordance with the received orders, and
  switching the first radio entity and the second radio entity so that the second radio entity is served by the network node.

29. The method according to claim 28, wherein after the second radio entity is served by the network node, the first radio entity is deactivated.

30. A user equipment, UE, in a wireless communication system supporting carrier aggregation, wherein the UE comprises:
  a first radio entity on which at least one component carrier is served by a network node,
  a receiving unit for receiving an indication from the network node for updating the at least one component carrier comprising an order which requires a retuning of the radio entity,
  a second radio entity, which is retuned in accordance with the received order of the first indication, and
  a switching unit for switching the first radio entity and the second radio entity after the second radio entity is retuned so that the second radio entity is served by the network node.

* * * * *